Patented Feb. 4, 1941

2,230,980

UNITED STATES PATENT OFFICE 2,230,980

CONVERSION OF HYDROCARBONS

Robert F. Ruthruff, Nutley, N. J., assignor to The Polymerization Process Corporation, Jersey City, N. J., a corporation of Delaware No Drawing. Application June 1, 1939, Serial No. 276,813. In Great Britain October 11, 1938

4 Claims. (Cl. 196—10)

This invention relates to catalytic contact material for the conversion of olefinic hydrocarbons to hydrocarbons of higher boiling points. More particularly, the invention relates to metal pyrophosphate polymerization contact agents of controlled activity.

Certain pyrophosphates including those of copper, zinc, magnesium, iron, aluminum and cobalt are capable of promoting the polymerization of olefins to higher boiling hydrocarbon products but must be activated by the production therein of an active modification. Formation of the active modification probably involves reduction, such as reduction of the copper of copper pyrophosphate from the cupric to the cuprous state to form an acid cuprous pyrophosphate. The reduction of metal pyrophosphate to the active modification may be effected by the treatment of the contact agent at elevated temperature with reducing materials such as the olefins under treatment, hydrogen, etc., for a length of time which depends on the metal pyrophosphate employed, its method of production, other materials associated therewith, etc. This reduction or activation period involves undesirable waste of gases, particularly when the olefins under treatment are employed.

It is an object of the present invention to produce a metal pyrophosphate contact agent which is susceptible in part at least to rapid reduction to the active modification without the necessity for prolonged treatment at elevated temperature.

It is a further object of the invention to produce a metal pyrophosphate contact agent which is capable of releasing the active modification without undue delay upon imposition of the reaction conditions and is further capable of releasing additional quantities of the active modification substantially continuously and at a substantially uniform rate over long periods whereby the catalytic material has a long active life.

According to the present invention a metal pyrophosphate contact agent capable of forming the active modification without undue delay upon imposition of the reaction conditions may be formed by associating with at least a part of the metal pyrophosphate a promoter for its reduction. For example, a copper pyrophosphate contact agent may have associated with at least a part of the copper pyrophosphate a reduction promoter consisting of zinc dust.

Reduction of the metal pyrophosphate to the active modification may be promoted by a variety of means, but in general finely divided metals such as copper, zinc, the zinc-copper couple, aluminum, especially aluminum activated with copper, mercury and the like have been found to be most effective.

Example

A 0.2 molar solution of sodium pyrophosphate is added to a 0.2–0.6 molar solution of a salt of the metal whose pyrophosphate is desired, such as copper sulfate, ferric nitrate, magnesium acetate, etc., the sodium pyrophosphate being added in an amount equal to only about 90–100% of the equivalent amount. The addition is carried out gradually and the reaction mixture is stirred during the addition. Also there is added to the sodium pyrophosphate solution zinc dust in an amount equal to 0.5 to 5% of the copper present. The zinc dust also may be suspended in the metal salt solution or may be distributed between the two solutions and by this method the zinc-copper couple is formed which is much more active than zinc dust itself. The precipitate is removed by filtration, washed thoroughly with water, dried and formed into pellets as desired for use in a polymerization reactor.

Catalytic material thus prepared may be employed in polymerizing gaseous olefinic hydrocarbons. Upon the passage over it of a mixture of butanes and butenes at a temperature of 350° F. and at a pressure of 1400 pounds per square inch, polymer production is observed immediately, or, at the most, in a very few hours.

Because of the presence of a reduction promoter such as in the catalytic material of the example it may be found that the catalytic material will in some circumstances reduce more rapidly than required for the continuance of the polymerization reaction at a steady rate over a considerable period of time. Under these conditions the catalytic material may lose its physical form and exhibit a relatively short active life. It is believed that during the active life of a satisfactory catalytic material reduction should be continuous with the gradual production of the active modification. The active modification, while a true catalyst, is gradually rendered inactive, possibly because of the deposition of carbonaceous residues, or for other reasons. In order to maintain constant activity fresh supplies of the active modification must be produced at a rate at least as rapid as that at which it is rendered inactive. However, too rapid reduction naturally results in rapid loss of strength and relatively short life. In accordance with the present invention the disadvantages of a metal pyrophosphate catalytic contact agent containing a reduction promoter associated with all parts thereof are overcome by combining with such material a suitable metal pyrophosphate free from a reduction promoter and/or metal pyrophosphate which is stabilized against reduction, for example, by having associated therewith a reduction inhibitor.

Certain metal pyrophosphates may be produced by the reaction of sodium pyrophosphate and metal salt in a manner whereby the metal pyrophosphate is stabilized against the reduction to the active modification. For example, if in reacting sodium pyrophosphate with a copper salt the sodium pyrophosphate is used in excess of the amount equivalent to the copper salt in accordance with the reaction

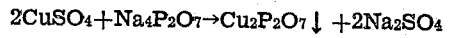
$$2CuSO_4 + Na_4P_2O_7 \rightarrow Cu_2P_2O_7 \downarrow + 2Na_2SO_4$$

there will be formed a double salt of sodium pyrophosphate and copper pyrophosphate. This double salt acts as an inhibitor of the reduction of copper pyrophosphate to the active modification. Copper pyrophosphate produced by such a method requires prolonged heating at or above the polymerization reaction temperature and in the presence of the reaction gases to initiate the production of polymers. Activation of such a catalyst may be initiated by raising the temperature well above the ordinary reaction temperature, after which the temperature may be reduced to the reaction temperature. For example, a copper pyrophosphate prepared by the use of the excess of the sodium pyrophosphate may be activated by heating at a temperature of 450–500° F. after which the reaction temperature may be lowered to ordinary operating levels, for example, 350–425° F. It is found that reduction continues after the temperature has been lowered if the reduction reaction is initiated at the higher temperature level. It is believed that the reduction products formed at the high temperature act as nuclei which promote the reduction of additional material at the lower temperatures. It should be understood, however, that the invention is not limited in scope in any manner by such theoretical considerations.

The improved catalytic contact agent may comprise a mixture of material containing from 10 to 50 per cent of a suitable metal pyrophosphate prepared according to the example and 50 to 90 per cent of a suitable metal pyrophosphate prepared in acordance with the example but with the use of an excess of the sodium pyrophosphate and without the inclusion of a reduction promoter. In addition there may be included metal pyrophosphate free from a reduction inhibitor or promoter. (The use of a mixture of copper pyrophosphate containing a reduction inhibitor and copper pyrophosphate free from a reduction inhibitor is disclosed and claimed in application Serial No. 276,814.) The catalytic material thus prepared becomes active at ordinary operating temperatures, maintains its initial physical form over long periods, and has a long active life. The promoted catalytic material confers initial activity while the slow subsequent reduction of the unpromoted or stabilized catalytic material confers long life and mechanical integrity. The proportions of the varieties of catalytic material in the composite material may be varied to give the most suitable catalytic material for given operating conditions since the severity of the reducing conditions is a function of such factors as the composition of the olefins being treated, the operating temperature, the per cent conversion, etc.

In the foregoing discussion of the catalytic material it is assumed that the metal pyrophosphate containing either a reduction inhibitor or a reduction promoter is formed into pellets by ordinary means prior to use. However, the catalyst thus formed will gradually lose mechanical strength, due to conversion of the metal pyrophosphate, to the reduced or active modification. For this reason it may be advisable to bind the catalyst before use. This may be accomplished by many known means, but a particularly suitable method involves mixing the powdered catalyst with about 5 per cent by weight of finely divided tar resulting from the treating of lubricating oil stocks with sulphuric acid. The mixture is pelleted, and the pellets are baked at 600° to 700° F. for a period of 24 hours. If desired the acid tar binder may be dissolved in a suitable solvent such as chloroform or benzol to facilitate incorporation in the catalyst.

The promoted and unpromoted metal pyrophosphates may be mixed mechanically as such to form the catalytic material or may be disposed separately or together on supporting materials. For example, the different varieties of the metal pyrophosphate may be formed separately into pellets optionally with the inclusion of supporting material after which the pellets are admixed mechanically, or the promoted and unpromoted varieties of the pyrophosphate optionally with accompanying supporting material may be admixed and then formed into pellets of suitable size for use as an improved contact agent for olefin polymerization.

I claim:

1. The method of converting olefinic hydrocarbons to hydrocarbons of higher boiling points which comprises contacting said olefinic hydrocarbons, under conditions of pressure, temperature and time suitable to effect said conversion, with catalytic contact material comprising copper pyrophosphate having associated therewith a reduction promoter whereby the said copper pyrophosphate is more readily reduced during the conversion treatment than copper pyrophosphate free from said reduction promoter.

2. The method of converting olefinic hydrocarbons to hydrocarbons of higher boiling points which comprises contacting said olefinic hydrocarbons, under conditions of pressure, temperature and time suitable to effect said conversion, with catalytic contact material comprising copper pyrophosphate having associated therewith a finely divided metal reduction promoter whereby the said copper pyrophosphate is more readily reduced during the conversion treatment than copper pyrophosphate free from said finely divided metal reduction promoter.

3. The method of claim 1 wherein said catalytic contact material comprises copper pyrophosphate prepared by reaction of a soluble copper salt and a soluble pyrophosphate in an aqueous solution wherein the ratio of the copper salt to the soluble pyrophosphate is at least equal to the stoichiometric ratio of these compounds whereby said copper pyrophosphate is substantially free from the double salt of copper pyrophosphate and the soluble pyrophosphate.

4. The method of claim 1 wherein said catalytic contact material comprises copper pyrophosphate prepared by the reaction of a soluble copper salt and a soluble pyrophosphate in an aqueous solution wherein the ratio of the copper salt to the soluble pyrophosphate is less than the stoichiometric ratio of these compounds whereby said copper pyrophosphate has associated therewith a double salt of copper pyrophosphate and the soluble pyrophosphate.

ROBERT F. RUTHRUFF.